(12) United States Patent
Solomon

(10) Patent No.: US 7,062,590 B2
(45) Date of Patent: Jun. 13, 2006

(54) METHODS AND STRUCTURE FOR PCI BUS BROADCAST USING DEVICE ID MESSAGING

(75) Inventor: Richard Solomon, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 230 days.

(21) Appl. No.: 10/651,742

(22) Filed: Aug. 29, 2003

(65) Prior Publication Data

US 2005/0060480 A1    Mar. 17, 2005

(51) Int. Cl.
*G06F 13/36* (2006.01)
(52) U.S. Cl. ....................................... 710/306
(58) Field of Classification Search ................ 710/306
See application file for complete search history.

(56) References Cited

U.S. PATENT DOCUMENTS

| | | | | |
|---|---|---|---|---|
| 5,751,975 A | * | 5/1998 | Gillespie et al. | 710/315 |
| 5,764,929 A | * | 6/1998 | Kelley et al. | 710/107 |
| 6,070,209 A | * | 5/2000 | Hausauer | 710/104 |
| 6,230,225 B1 | * | 5/2001 | Olarig et al. | 710/306 |
| 6,230,227 B1 | * | 5/2001 | Fry et al. | 710/314 |
| 6,449,677 B1 | * | 9/2002 | Olarig et al. | 710/305 |
| 6,611,912 B1 | * | 8/2003 | Maleck et al. | 713/100 |
| 6,895,456 B1 | * | 5/2005 | Olarig et al. | 710/100 |

* cited by examiner

*Primary Examiner*—Rehana Perveen
*Assistant Examiner*—Christopher A Daley
(74) *Attorney, Agent, or Firm*—Duft, Bornsen & Fishman LLP

(57) ABSTRACT

Methods and associated structure for providing broadcast of PCI bus transactions using device ID messaging (DIM) features of the PCI bus specifications. A vendor defined class of messages are defined using device ID messaging to provide broadcast of messages across PCI bus bridge devices to multiple PCI bus segments. One aspect hereof provides for using implicitly addressed device ID messaging such that bridge devices, compatible with the vendor defined message classes, will forward the message upstream and downstream. Another feature provides for use of explicitly addressed device ID messaging to effectuate the desired broadcast. Another aspect hereof provides for translation of a received DIM formatted message with broadcast information and applying the broadcast information to a second bus segment as a standard PCI broadcast transaction.

11 Claims, 4 Drawing Sheets

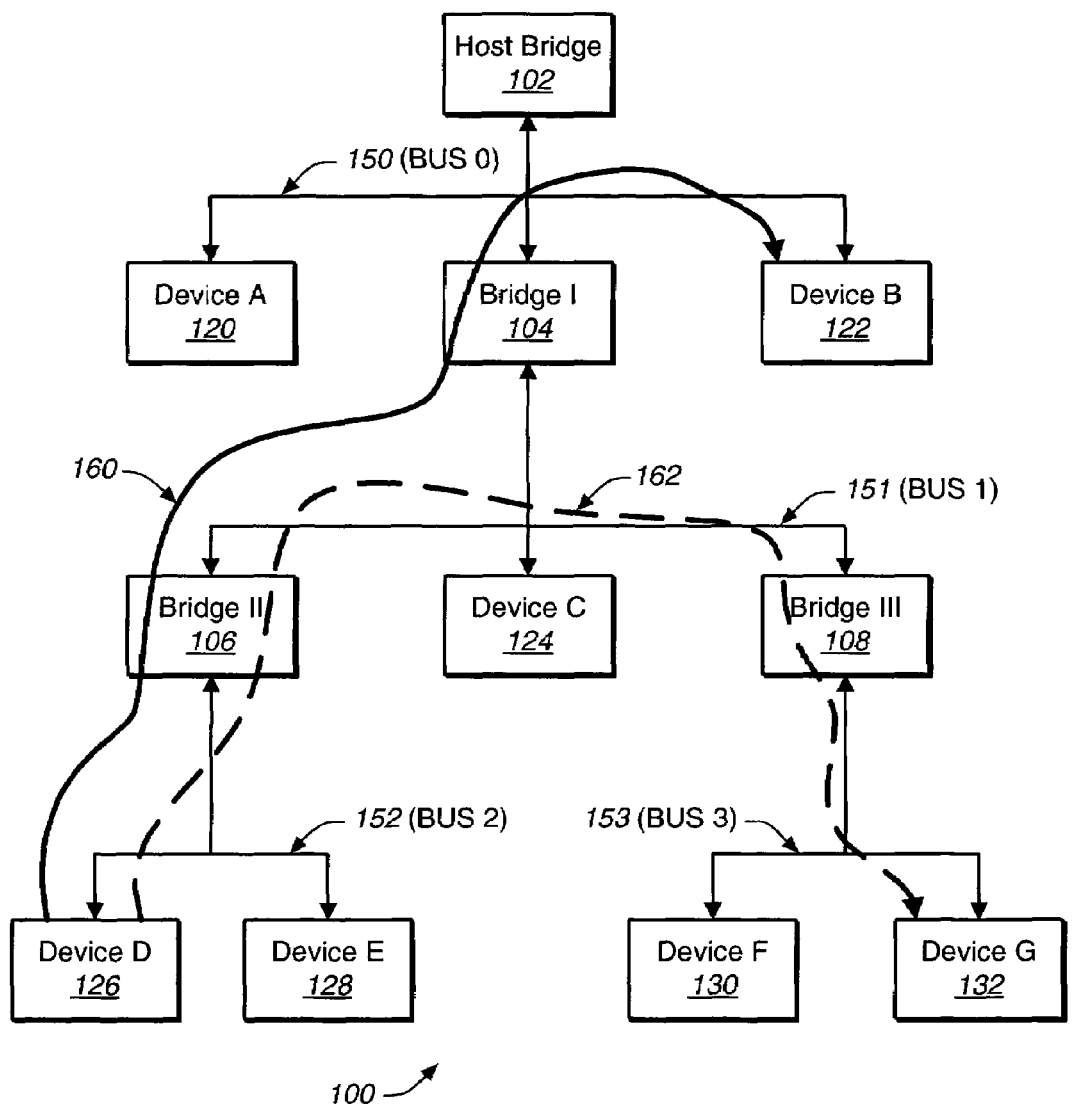
FIG._1

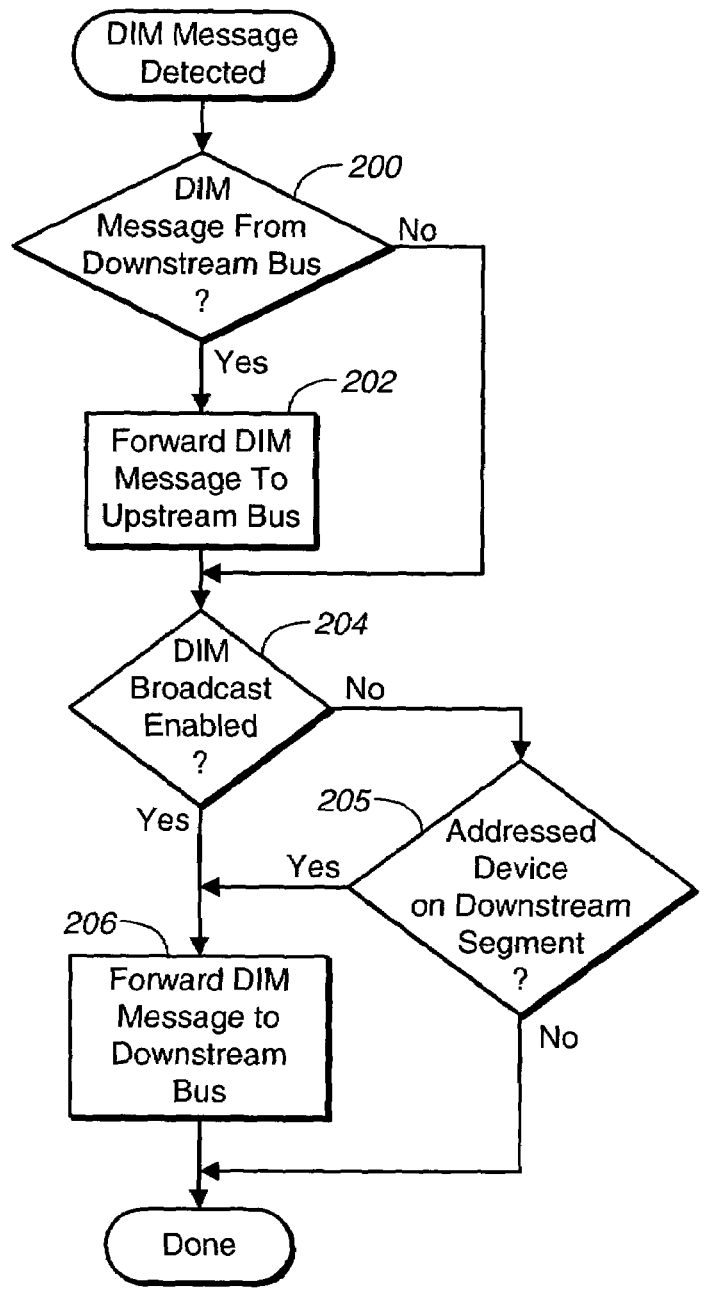
FIG._2
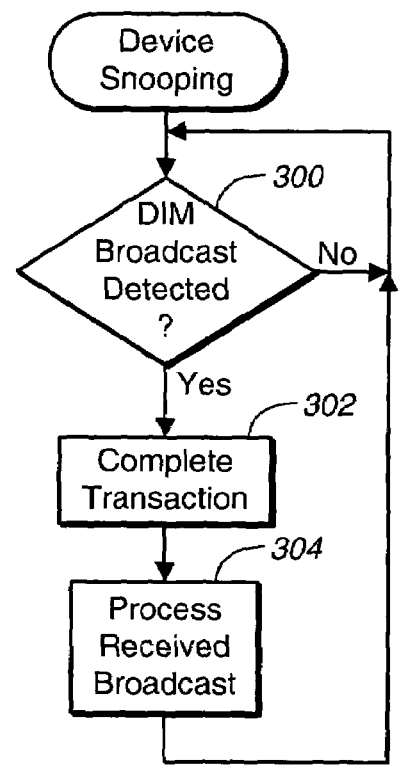
FIG._3

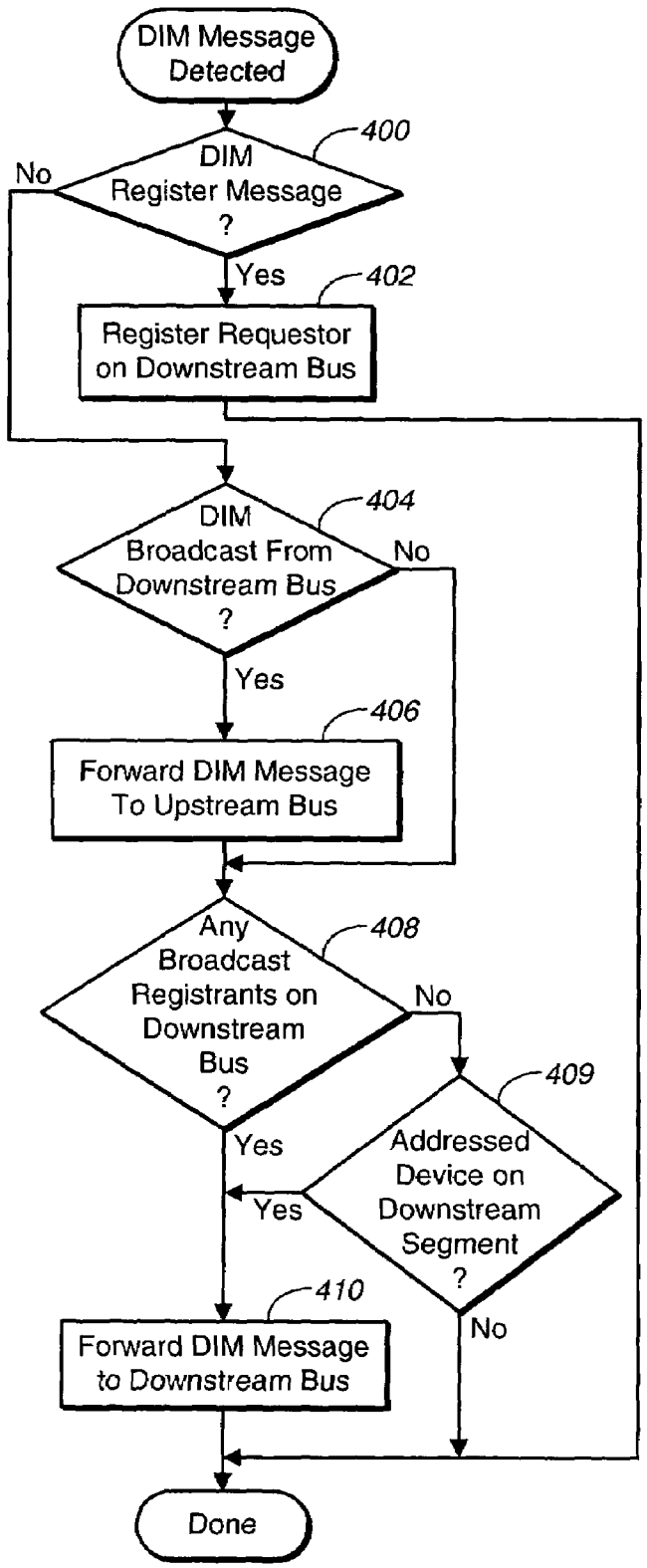
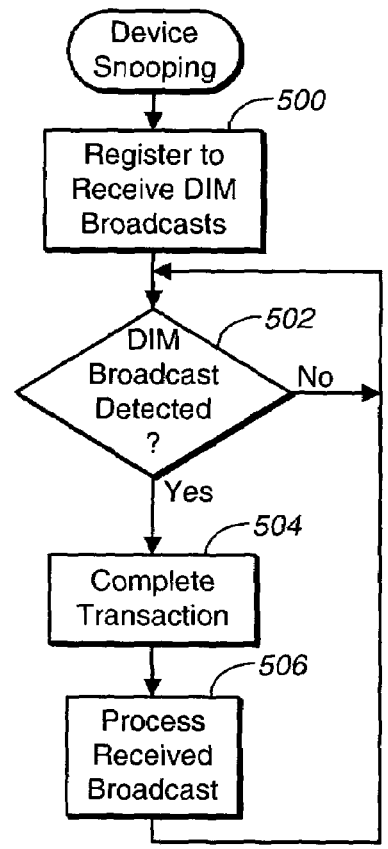
FIG._4
FIG._5

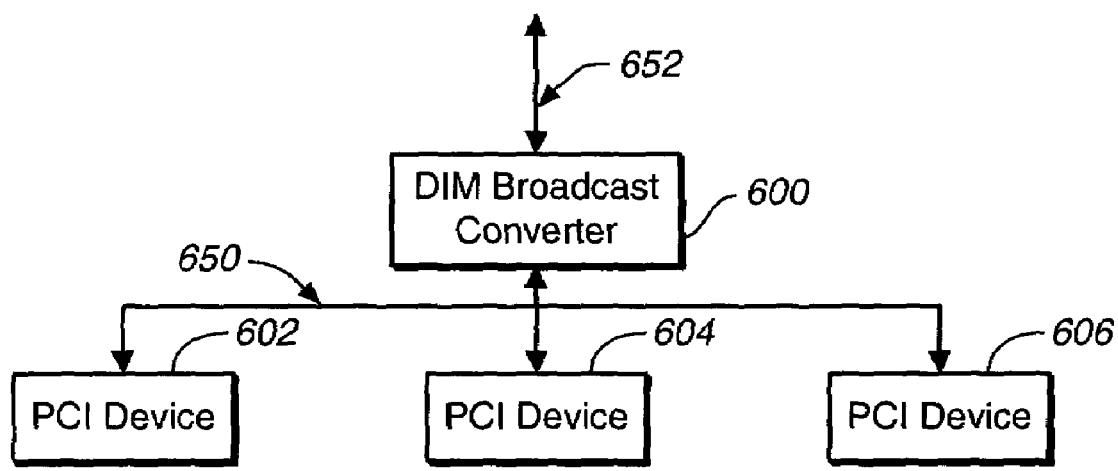
FIG._6
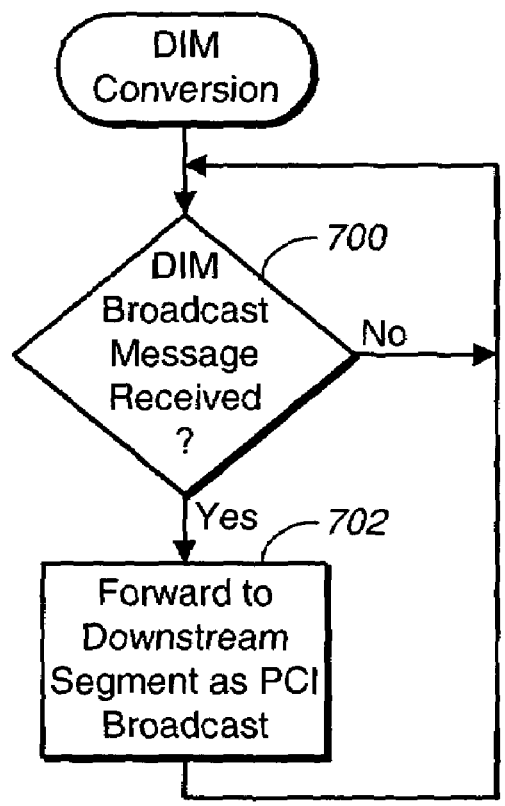
FIG._7

METHODS AND STRUCTURE FOR PCI BUS BROADCAST USING DEVICE ID MESSAGING

BACKGROUND OF THE INVENTION

1. Field of the Invention

The invention relates generally to PCI bus communication and, more specifically, relates to use of Device ID Messaging ("DIM") to accomplish broadcast message exchange through one or more PCI bus segments.

2. Discussion of Related Art

PCI buses have become common in computing and other electronic systems for coupling peripheral device interface components with associated processing components. Most present day personal computers as well as higher performance server systems include one or more PCI buses adapted for coupling high speed and low speed I/O devices to one another and to associated processors. Such processors may include, for example, a general purpose central processing unit ("CPU") within the computer or a special purpose processor such as a direct memory access controller ("DMAC").

PCI bus standards and specifications have evolved over the past years to incorporate numerous additional features and enhanced performance specifications. Published specifications for PCI buses and PCI-PCI bridge architectures, including recent versions referred to as PCI-X, are well known to those skilled in the art and are generally available at: http://www.pcisig.com/specifications. All PCI bus architecture standards available at www.pcisig.com are hereby incorporated by reference.

It is common in complex, high-performance applications to utilize multiple such PCI buses within a particular system. For example, a first PCI bus may be dedicated to interfacing with high speed peripheral devices while a second PCI bus may be reserved for interfacing with lower speed devices. Such segregation of devices onto multiple buses allows for optimizing characteristics or parameters in the operation of each bus as appropriate for the particular devices.

Where multiple buses are present in the system, is often desirable to connect all or some portion of the buses together through PCI bridge devices. A PCI bridge device couples one PCI bus segment to another PCI bus segment buffering and adapting signals as required to couple bus segments having disparate bus characteristics and timing requirements. In more complex systems several bus segments may be coupled through multiple bus bridges arranged in a hierarchical fashion. For example, some storage systems and other systems have embedded control elements that communicate amongst themselves to control operation of the system. The control elements (i.e., storage controllers, host adapters, Fibre Channel I/O adapters, etc) may communicate with one another via a hierarchical arrangement of PCI buses. Regardless of the particular hierarchy and architecture used in such complex systems, PCI bus bridges generally allow any master device on any PCI bus segment to exchange information with any slave device on any other PCI bus segment. Such flexibility may be provided while maintaining segregation of the various devices on each segment allows for controlling utilization of bus bandwidth according to performance characteristics and requirements of the various devices.

Frequently it is desirable to broadcast a message to all devices on a particular PCI bus segment. Current PCI bus standards permit such a broadcasting within a particular PCI bus segment. In other words, one device on a PCI bus segment may broadcast a message to all other devices on the same bus segment. However, in more complex systems having multiple PCI buses coupled together through one or more PCI bridge devices, such broadcasting is problematic. PCI bus bridge devices are not required by PCI specifications to forward such a broadcast message from one PCI bus segment to another. It is therefore a problem to broadcast PCI bus transactions through bus bridge's and multiple bus segments in a complex system architecture.

One present a solution to work around the inability to forward broadcast messages through PCI bus bridges has been to provide additional signal paths above and beyond those specified for the PCI bus. Such additional signal paths are often referred to as sideband signals in the sense that they are apart and distinct from standard signals defined by the PCI bus specifications. Such sideband signals may be defined as additional physical paths above and beyond those defined by PCI bus specifications or may be defined as nonstandard utilization of reserved or otherwise defined signal paths in the PCI bus standards. In the former case, additional signal paths may add significant cost and complexity to a system while the latter solution utilizes defined signal paths otherwise defined by PCI bus specifications and is therefore inconsistent with the PCI bus standards.

Another present approach to working around limitations on broadcasting PCI bus messages provides for generating multiple copies of such a message each being addressed specifically to each device known to be present on the PCI buses. These messages do not rely on bus bridge devices to forward broadcast messages but rather specifically address each of the multiple copies as a message to a specific device. Such a workaround may dramatically increase bus utilization in the system and thereby reduce overall performance of the system.

It is evident from the above discussion that improve methods and structures are needed to provide, in effect, broadcast features for PCI bus transactions but in systems utilizing multiple PCI bus segments interconnected through one or more PCI bus bridge devices.

SUMMARY OF THE INVENTION

The present invention solves the above and other problems, thereby advancing the state of the useful arts, by providing methods and associated structure to utilize PCI bus Device ID Messaging (DIM) to effectuate broadcast of PCI bus messages over multiple PCI bus segments coupled by one or more PCI bus bridge devices. DIM is supported in the PCI bus, PCI-X bus, and PCI-PCI bus bridge standards such that DIM messages must be forwarded through PCI-PCI bus bridge devices. Vendor definable fields within DIM messages may be provided by a particular vendor for completion devices (i.e., slave or target devices intended to receive a message) and bridge devices supporting that vendor's class of messages. DIM messages intended for broadcast capabilities are forwarded by methods and structures hereof to provide improved broadcast features for systems having multiple PCI bus segments coupled through one or more PCI bus bridge devices compatible with the vendor defined class of DIM messages. By contrast with previous work around solutions, features and aspects hereof provide broadcast-like features within standard specifications for the PCI bus and without unduly burdening the system by over utilizing available bus bandwidth. In another aspect hereof, a device and corresponding method is provided to convert a received DIM message with vendor defined class information for broadcast into a standard PCI bus segment broadcast for a PCI bus segment coupled to the device.

A first feature hereof therefore provides a method for broadcasting over multiple PCI bus segments comprising: transmitting a DIM transaction from a first device to a first bus bridge device wherein both the first device and the first bus bridge device are coupled to a first PCI bus segment; recognizing, within the bus bridge device, vendor defined information in the DIM transaction; and forwarding the DIM transaction through the bus bridge device to a second PCI bus segment in accordance with the vendor defined information.

Another feature hereof provides a system for PCI bus broadcasting comprising: a first PCI bus segment; a broadcasting device coupled to the first PCI bus segment wherein the broadcasting device is adapted to generate a DIM transaction and to apply the DIM transaction to the first PCI bus segment; a second PCI bus segment; a PCI-PCI bus bridge coupled to the first and second PCI bus segments wherein the bus bridge is adapted to forward the DIM transaction to multiple devices via the second PCI bus segment.

Another feature hereof provides a system for PCI bus broadcasting comprising: multiple PCI-PCI bus bridge devices each adapted to be coupled to an upstream PCI bus segment and a downstream PCI bus segment; and multiple PCI bus segments wherein the multiple PCI bus segments are coupled to the multiple PCI-PCI bus bridge devices so as to form a hierarchical structure of PCI bus segment, wherein at least one bridge devices of the multiple PCI-PCI bridge devices is adapted to receive DIM broadcast transactions including vendor defined information and is adapted to forward the DIM broadcast transactions to at least one other bridge device of the multiple PCI-PCI bridge devices in accordance with the vendor defined information in each DIM broadcast transaction.

Another feature hereof provides a method for disseminating broadcast information over multiple PCI bus segments, the method comprising: receiving a DIM formatted transaction from a first PCI bus segment wherein said DIM formatted transaction includes vendor specific broadcast information; and applying the broadcast information to a second PCI bus segment as a PCI bus broadcast transaction.

Another feature hereof provides a device for disseminating broadcast information over multiple PCI bus segments, the device comprising: a first PCI bus segment interface from which a DIM formatted transaction may be received having vendor specific broadcast information; a second PCI bus segment interface; and logic operable to receive the broadcast information and to apply the broadcast information to said second PCI bus segment as a PCI standard broadcast transaction.

BRIEF DESCRIPTION OF THE DRAWINGS

FIG. 1 is a block diagram of a system providing DIM formatted messages for broadcasting over multiple PCI bus segments coupled by PCI-PCI bus bride devices.

FIG. 2 is a flowchart describing a method operable in a PCI-PCI bus bridge to forward DIM formatted messages upstream and downstream to effectuate broadcast thereof.

FIG. 3 is a flowchart describing a method operable in a PCI device to process DIM messages with broadcast information.

FIG. 4 is a flowchart describing a method operable in a PCI-PCI bus bridge to forward DIM formatted messages upstream and downstream to registered devices to effectuate multicast thereof.

FIG. 5 is a flowchart describing a method operable in a PCI device to register for multicast processing and to process DIM messages with broadcast information.

FIG. 6 is a block diagram of another aspect hereof for converting a DIM formatted broadcast message into a standard PCI broadcast message.

FIG. 7 is a flowchart describing operation of the structure of FIG. 6.

DETAILED DESCRIPTION OF THE DRAWINGS

FIG. 1 is a block diagram of a system 100 in which features and aspects hereof are applied to permit broadcasting of messages over multiple PCI bus segments. As noted above, the PCI bus specifications preclude a PCI-PCI bus bridge device from forwarding broadcast messages from one PCI bus segment to another. In complex, multiple bus segment applications, it has heretofore been a problem to enable broadcast of messages over such multiple PCI bus segments. System 100 of FIG. 1 is exemplary of such a complex, multiple bus segment application wherein a plurality of devices (120 through 132) are distributed over multiple bus segments (150 through 153) coupled by multiple bus bridge devices (104 through 108).

Often such applications arrange the various segments and bridges so as to define a hierarchical topology of bus segments. The distribution of devices over such PCI bus segments may be desirable to segregate normal bus transaction traffic for a variety of types or classes of devices. For example, one PCI bus segment may be dedicated to high speed mass storage device interactions while other PCI bus segments may be reserved for lower speed I/O device interactions. By segregating the various devices according to the performance needs of each, overall system performance may be enhanced.

By way of example as shown in FIG. 1, device A 120 and device B 122 are interconnected through PCI bus segment 150. In like manner, device C 124 is coupled to PCI bus segment 151, devices D and E. 126 and 128 are coupled to PCI bus segment 152, and devices F 130 and G 132 are coupled to PCI bus segment 153. The various bus segments maybe coupled through PCI-PCI bus bridge devices. For example, bus segment 150 is coupled to bus segment 151 through PCI-PCI bus bridge device 104. In like manner, bus segment 151 is coupled to bus segment 152 through PCI-PCI bus bridge device 106, and bus segment 151 is coupled to bus segment 153 through PCI-PCI bus bridge device 108.

Host bridge 102 may provide features to couple one of the PCI bus segments (i.e., bus segment 150) to an appropriate host system bus (not shown). For example, a particular bus associated with a system processor may be coupled to PCI bus segment 150 via host bridge 102. Often, host bridge 102 is an integrated circuit component of the "chipset" associated with a particular processor (one integrated circuit of a collection of one or more related integrated circuits to provide standard interfacing to the system bus of a system processor).

Although a device on a first bus segment may address a specific transaction to a device on a second bus segment, broadcast messages are not forwarded through a PCI-PCI bus bridge device from a first bus segment to a second bus segment. Features and aspects hereof enhance operation of PCI-PCI bus bridge devices 104 through 108 to thereby permit, in effect, broadcasting of messages to all, or any subset of, devices in system 100. In general, a PCI-PCI bus a bridge device 104 through 108 may provide features hereof by detecting transmission of device ID messaging (DIM) transactions that include vendor unique information indicating that the message is to be broadcast to all devices (or a selected set of devices) of system 100. As noted above, PCI bus specifications require a PCI-PCI bus bridge device to forward any such DIM transaction upstream. Features hereof further require a compliant PCI-PCI bus bridge device to forward DIM messages requesting broadcast of information downstream to other devices and other bus bridge devices. As used herein, upstream and downstream are used in the same sense as described in PCI-PCI bridge architecture specifications. In particular, the primary interface of a PCI-PCI bus bridge is that interface connected to a PCI bus segment closest to the system CPU while the secondary interface is that interface of a PCI-PCI bus bridge device coupled to a bus segment furthest from the system CPU. Downstream transactions are those that are forwarded through the PCI-PCI bus bridge device from the primary interface to the secondary interface. Upstream transactions are those that are forwarded through the bridge device from the secondary interface to the primary interface.

In one aspect hereof, a PCI-PCI bus bridge device may recognize a DIM message requesting broadcast of information and may forward the DIM message both upstream and downstream to effectuate desired broadcast of supplied information to all devices of the system. In one aspect hereof the host bridge device also supports recognition and forwarding of such DIM messages including broadcast information. The host bridge would assure that the DIM message is a forwarded downstream to all lower levels of the hierarchical topology.

FIG. 1 includes two curved line arrows (160 and 162) depicting transmission of a DIM message with broadcast information in accordance with features and aspects hereof. Solid arrow 160 indicates the upstream transmission of a DIM message including broadcast information. Such a message may be generated by device D 126 and may be applied to bus segment 152. Device E 128, if properly configured to snoop for broadcast information in DIM messages, may detect the DIM message with broadcast information. In addition, PCI-PCI bus bridge II 106 may detect the DIM message transaction on bus 152 and forward the transaction upstream to bus segment 151. Further following arrow 160, bridge I 104 may detect the DIM message transaction on bus segment 151 and forwarded the transaction upstream to bus segment 150. With the DIM message including broadcast information so forwarded upstream from bus 152 to bus 151 and then to bus 150, device A 120, device B 122, device C 124 and device E 128 all have the opportunity to snoop for such DIM message broadcast bus transactions and thereby receive the intended broadcast information. In accordance with features hereof, dashed line 162 shows additional forwarding of such a DIM message broadcast downstream through bus bridge III 108. Bus bridge III 108 detects the DIM message with broadcast information applied to bus segment 151 by operation of bridge II 106. In response to detection of such a DIM message, bridge 108 may forward the transaction downstream for application to bus segment 153. On bus segment 153, device F 130 and device G 132 may sense and process the DIM message with broadcast information to thereby effectuate a complete broadcast from device D 126 to all other devices of system 100.

Those of ordinary skill in the art will recognize that the specific topology and devices depicted in FIG. 1 are intended merely as exemplary of typical applications of hierarchically arranged PCI bus segments. Numerous other configurations and topologies with any number of bus segments and interconnecting bridges will be readily apparent to those skilled in the art. All such configurations may usefully apply features and aspects hereof to enable broadcast of messages to devices distributed over multiple PCI bus segments through one or more PCI-PCI bus bridge devices.

FIG. 2 is a flowchart describing operation of a PCI-PCI bus bridge device operating in compliance with features and aspects hereof to utilize DIM message formats to effectuate broadcast of information to all devices in a multiple bus segment architecture. Element 200 of FIG. 2 is first operable in response to detecting a DIM message transaction applied by a device to the bus segment coupled to either the primary or secondary interface of the PCI-PCI bus bridge device. Element 200 determines whether the detected DIM message was applied to the bus segment coupled to its downstream side (secondary interface). If so, the bus bridge device forwards the received DIM transaction to its upstream interface by operation of element 202 as required by the PCI bus and bus bridge specifications. If element 200 determines that the DIM transaction was applied to the bus bridge device from its upstream connection, the bridge need not forward the transaction upstream since it originated from that bus segment. In both cases, processing continues at element 204.

Element 204 then determines whether DIM message broadcasting is enabled or available within the bus bridge device. If so, element 206 is operable to forward the received DIM message to the PCI bus segment downstream of the bus bridge device (i.e., the bus segment coupled to the secondary interface of the bus bridge device). When the DIM message broadcasting features and aspects hereof are not available in a bridge device (i.e. a non-compliant bridge device), element 205 next determines if the device explicitly addressed by the DIM message is on the downstream bus segment. If so, the DIM message is forwarded to the downstream segment in accordance with standard PCI bus and PCI-PCI bus bridge standards. If the addressed device is not on the downstream segment and DIM message broadcasting is not enabled or available, the DIM message is not forwarded downstream as specified by PCI bus and PCI bus bridge standards.

Those skilled in the art will recognize that the DIM formatted messages used in accordance with the process of FIG. 2 may utilize implicit addressing features of the PCI bus specifications and standards. Implicitly addressed DIM transactions will be forwarded upstream from the bridge device in accordance with PCI bus specifications and standards. Further, in accordance with features and aspects hereof, DIM transactions including broadcast related information in the vendor defined portions of the transaction will also be forwarded downstream to thereby effectuate broadcast of information across bus bridge devices to a plurality of devices distributed over a plurality of PCI bus segments.

Still further, explicitly addressed DIM transactions that include vendor defined broadcast related information may be forwarded in accordance with features and aspects hereof despite indications based on the explicit address information that the DIM transaction is not addressed to a particular bus segment.

In conjunction with enhanced operation of bus bridge devices as exemplified by FIG. 2, devices coupled to PCI bus segments may be adapted to snoop for DIM broadcast messages. A PCI device snooping to detect DIM messages with broadcast information may also be referred to herein as listener or as engaged in listening. FIG. 3 is a flowchart describing a snooping process within devices coupled to PCI bus segments through enhanced bus bridge devices. Element 300 first determines whether a DIM broadcast message has been detected on the PCI bus segment to which the device is coupled. If not, normal processing continues within the PCI device and element 300 of FIG. 3 continues to await detection of a DIM broadcast message. Upon detection of a DIM broadcast message, element 302 is operable to complete the PCI bus transaction. In normal DIM message processing according to existing standards of PCI bus and PCI bus bridge processing, a DIM message is only forwarded by a bus bridge when the addressed device is on its downstream bus segment. In such a case, the addressed device will complete the PCI bus cycle in accordance with standard processing. Where a DIM message is forward as a broadcast message in accord with features and aspects hereof, the PCI-PCI bus bridge that performs the forwarding may complete the bus cycle so that snooping devices on that bus segment need not coordinate the completion of the cycle. Element 304 is then operable to process the received broadcast message as appropriate for the particular message. The content of the broadcast information in the DIM message and the substantive processing of that information will be as appropriate to the particular application needs for broadcast. Such processing techniques will be readily understood by those of ordinary skill in the art.

Other aspects and features hereof provide for use of DIM messages to enable multicast messages to be forwarded to selected devices. Multicast messages are identical in most regard to the broadcast features discussed above but are directed to a plurality of devices rather than all devices within a particular system. In general, features hereof provide for a DIM registration message transaction generated by each device desiring to participate in such multicast operations. The registration message is applied to the PCI bus segment on which the device resides and indicates the device's desire to participate in DIM multicast operations. The PCI bus bridge device immediately upstream on that bus segment will, if compliant with features hereof, process the registration request and note the device's desire to participate in the multicast operations. A bridge device not compliant with DIM registration request will simply forward the registration request upstream as it must for any DIM message. DIM broadcast messages received in a compliant bridge devices are then forwarded upstream (as it must for any DIM message) and also forwarded downstream to any devices that have registered the desire to participate in the multicast operations.

FIG. 4 is a flowchart describing DIM multicast processing within a compliant PCI-PCI bus bridge device. The method is generally operable in response to receipt of a DIM formatter message on a bus segment coupled to a bus bridge device. Element 400 his first operable in response to receipt of a DIM formatted message to determine whether the received message is a registration request. If so, element 402 is operable to complete the method by registering the requesting device as desirous of participating in multicast DIM message exchanges. Registering the requesting device may entail, for example, recording identification information regarding the requesting device in a memory associated with the bus bridge device. Techniques and memory structures for recordation of information in an appropriate volatile or non-volatile memory associated with the bridge will be readily understood by those skilled in the art. If element 400 determines that the received DIM message is not a registration request the method presumes the DIM message to be a broadcast request. Element 404 is operable to determine whether the received DIM message is a broadcast request message applied to the bus segment downstream of the bus bridge (i.e., applied to the secondary interface of the bus bridge device). If so, element 406 is operable to forward the received DIM broadcast request message to the PCI bus segment upstream of the bus bridge. In both cases, processing continues with element 408 to determine whether any devices downstream of the bus bridge device have registered for participation in multicast operations. If not, element 409 is operable to determine if the DIM message is a standard DIM message addressed to a device on the bridge's downstream bus segment. If so, processing continues with element 410 to forward the DIM message to the downstream bus segment. If not, the method completes to be restarted upon detection of another DIM formatted message. If element 408 determines that devices downstream from the bridge have registered their desire to participate in multicast operations, element 410 is operable to forward the DIM formatted broadcast message to all such registered devices downstream of the bus bridge device.

FIG. 5 is a flowchart of a process operable within a PCI device coupled to a bus segment in a system having a bus bridge operable in accordance with the method of FIG. 4. Element 500 is first operable to generate a DIM formatted message requesting registration of the device to participate in DIM message multicast operations. The registration request is applied to the PCI bus segment to which the device is coupled to be processed by a compliant PCI-PCI bus bridge device operable in accordance with the method of, for example, FIG. 4.

Element 502 is next operable to determine whether a DIM broadcast message has been detected on the PCI bus segment to which the device is coupled. If not, normal processing continues within the PCI device and element 502 of FIG. 5 continues to await detection of a DIM broadcast message. Upon detection of a DIM broadcast message, element 504 is operable to complete the PCI bus transaction. As above, the PCI-PCI bus bridge device may complete the transaction. In addition, the PCI-PCI bus bridge that serves to register participants in the broadcast operation may designate one of the registered devices to complete the forwarded DIM transaction on the downstream bus. For example, the PCI-PCI bus bridge may designate the first PCI device to register as a broadcast participant as the device responsible for completing the forwarded bus transaction. Element 506 is then operable to process the received broadcast message as appropriate for the particular message. The content of the broadcast information in the DIM message and the substantive processing of that information will be as appropriate to the particular application needs for broadcast. Such processing techniques will be readily understood by those of ordinary skill in the art.

The methods of FIGS. 2 through 5 are intended merely as representative of possible embodiments of features and aspects hereof to provide for broadcast of information among a plurality of PCI devices distributed over multiple PCI bus segments coupled through one or more PCI-PCI bus bridge devices. Whereas PCI broadcasts messages are not forwarded across PCI-PCI bus bridges, DIM messages in accordance with the PCI specifications and in accordance with the features and aspects hereof are forwarded across PCI-PCI bus bridge devices FIG. 6 shows another aspect hereof in which a device 600 coupled to a first PCI bus segment 652 converts DIM broadcast messages (as discussed above) into a standard PCI bus broadcast message. The standard PCI bus broadcast message is then applied by device 600 to a second (downstream) PCI bus segment 650 as a standard broadcast within that downstream segment. The standard PCI bus broadcast message so applied to bus segment 650 is then received and processed by all PCI devices 602, 604 and 606 on the downstream bus segment 650 in accordance with standard PCI bus standards.

Such an embodiment provides another approach to disseminating broadcast information through a hierarchy of multiple PCI bus segments. Device 600 need not be a full featured PCI-PCI bus bridge device compliant with all aspects of PCI bus and bridge standards. Rather, device 600 may more generally receive a DIM formatted message containing vendor specific broadcast information and apply it to all devices on a second bus segment as a PCI standard broadcast message.

FIG. 7 is a flowchart describing the operation of device 600 of FIG. 6. Element 700 awaits receipt of a DIM formatted message containing vendor specific broadcast information. Such a message may be received on a first PCI bus segment (an "upstream" bus segment). Upon receipt of such a properly formatted DIM message, element 702 then forwards or applies the broadcast information to a second PCI bus segment (a "downstream" bus segment). Processing then continues by looping back to element 700 to await receipt of a next properly formatted DIM message. The broadcast information may be extracted from the received DIM message and reformatted as necessary to generate a standard PCI bus broadcast transaction or series of transactions.

Those skilled in the art will recognize that the features hereof may be implemented as an application specific integrated circuit or as a custom circuit adapted for a particular application. In addition, the features hereof may be implemented as a suitably programmed general purpose or special purpose programmable device or processor.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for broadcasting over multiple PCI bus segments comprising:
    transmitting a DIM transaction from a first device to a first PCI-PCI bus bridge device wherein both the first device and the first PCI-PCI bus bridge device are coupled to a first PCI bus segment and wherein the first PCI-PCI bus bridge device is also coupled to a second PCI bus segment;
    recognizing, within the PCI-PCI bus bridge device, vendor defined information in the DIM transaction; and
    forwarding the DIM transaction through the PCI-PCI bus bridge device to one or more devices coupled to either or both of the first PCI bus segment and the second PCI bus segment in accordance with the vendor defined information.

2. The method of claim 1 further comprising:
    repeating the steps of forwarding upstream and forwarding downstream within each PCI-PCI bus bridge device of a system.

3. The method of claim 1 wherein the DIM transaction is explicitly addressed and wherein the method further comprises:
    registering devices desirous of receiving broadcast DIM transactions; and
    forwarding the DIM transaction according to the explicit address in the DIM transaction and to any PCI bus segment on which a device has registered as desirous of receiving broadcast DIM transactions.

4. The method of claim 3 wherein the step of registering comprises the steps of:
    device of the multiple PCI-PCI bridge devices in accordance with the vendor defined information in each DIM broadcast transaction.

5. A system for PCI bus broadcasting comprising:
    a first PCI bus segment;
    a broadcasting device coupled to the first PCI bus segment wherein the broadcasting device is adapted to generate a DIM transaction and to apply the DIM transaction to the first PCI bus segment;
    a second PCI bus segment;
    a PCI-PCI bus bridge coupled to the first and second PCI bus segments wherein the PCI-PCI bus bridge is adapted to broadcast the DIM transaction to multiple devices via the second PCI bus segment.

6. The system of claim 5 further comprising: a slave device coupled to the second PCI bus segment wherein the slave device is adapted to process the DIM transaction.

7. A system for PCI bus broadcasting comprising:
    multiple PCI-PCI bus bridge devices each adapted to be coupled to an upstream PCI bus segment and a downstream PCI bus segment; and
    multiple PCI bus segments wherein the multiple PCI bus segments are coupled to the multiple PCI-PCI bus bridge devices so as to form a hierarchical structure of PCI bus segment,
    wherein at least one bridge devices of the multiple PCI-PCI bridge devices is adapted to receive DIM broadcast transactions including vendor defined information and is adapted to forward the DIM broadcast transactions to at least one other PCI-PCI bridge.

8. The system of claim 7 wherein one of the multiple PCI-PCI bus bridge devices at a highest level of the hierarchical structure is designated as the host bridge device and wherein all DIM broadcast transactions forwarded toward the host bridge device on a PCI bus segment coupled thereto are forwarded by the host bridge device downstream toward oilier PCI-PCI bus bridge devices coupled to other PCI bus segments.

9. The system of claim 7 wherein at least one PCI-PCI bus bridge of the multiple PCI-PCI bus bridge devices coupled to a PCI bus segment is adapted to receive DIM registration transactions from devices on the PCI bus segment and wherein the PCI-PCI bus bridge device is adapted to forward DIM broadcast transactions received from another PCI bus segment coupled to the PCI-PCI bus bridge to devices from which DIM registration transactions where previously received.

10. A method for disseminating broadcast information over multiple PCI bus segments, the method comprising:
    receiving a DIM formatted transaction from a first PCI bus segment wherein said DIM formatted transaction includes vendor specific broadcast information; and
    applying the broadcast information to a second PCI bus segment as a PCI bus broadcast transaction.

11. A device for disseminating broadcast information over multiple PCI bus segments, the device comprising:
- a first PCI bus segment interface from which a DIM formatted transaction may be received having vendor specific broadcast information;
- a second PCI bus segment interface; and
- logic operable to receive the broadcast information and to apply the broadcast information to said second PCI bus segment as a PCI standard broadcast transaction
- forwarding a second DIM transaction from a listener device desirous of receiving broadcast DIM transactions to an attached PCI-PCI bus bridge device coupled to the listener through a PCI bus segment;
- recognizing, within the PCI-PCI bus bridge device, second vendor defined information in the second DIM transaction; and
- registering the listener device within the attached PCI-PCI bus bridge device as a device desirous of receiving broadcast DIM transactions.

* * * * *